Oct. 4, 1955 2,719,611
C. M. L. L. BOURCIER DE CARBON DE PRÉVINQUIÈRES
HYDRAULIC SHOCK ABSORBER WITH FLEXIBLE RESERVOIR
Filed Jan. 18, 1950
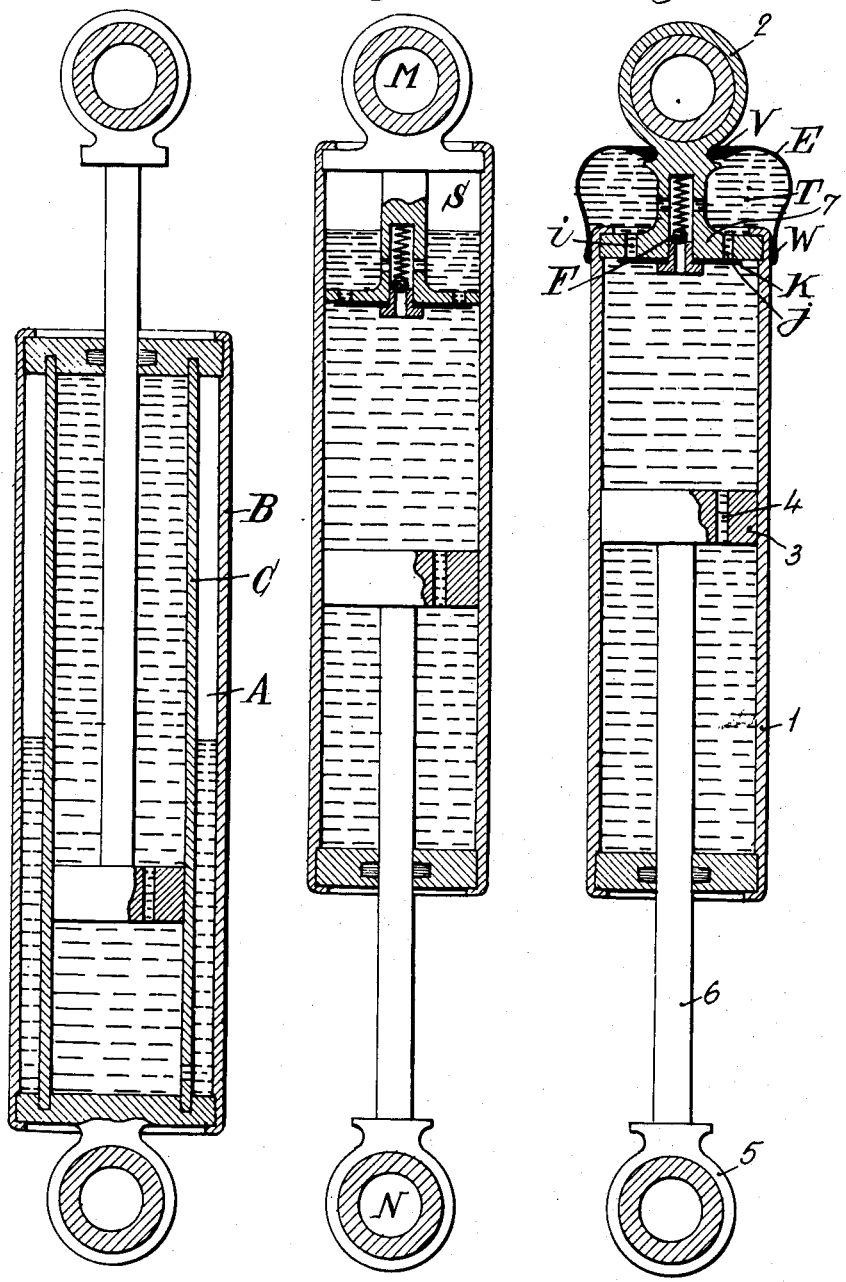

United States Patent Office 2,719,611
Patented Oct. 4, 1955

2,719,611

HYDRAULIC SHOCK ABSORBER WITH FLEXIBLE RESERVOIR

Christian Marie Lucien Louis Bourcier de Carbon de Prévinquiéres, Paris, France

Application January 18, 1950, Serial No. 139,284

Claims priority, application France January 19, 1949

3 Claims. (Cl. 188—88)

This invention relates to hydraulic shock-absorbing apparatus, and more particularly to shock-absorbers of the telescopable type.

Among the most difficult problems encountered in the design of hydraulic shock-absorbers of the above-defined type is that of providing compensation for the volume of the piston-rod. On the one hand, it is necessary that the piston-rod be fully telescopable into the operating cylinder of the shock-absorber during the contraction stroke thereof, and on the other hand it is necessary to prevent the occurrence of cavitation effects. Since oil is an incompressible fluid to all practical purposes, it becomes necessary, if both the above conditions are to be fulfilled simultaneously, to provide a compensating capacity located outside the operating cylinder in which the piston operates.

In the drawing, Figs. 1, 2 and 3 are sectional views of three forms of shock absorbing apparatus.

In the majority of current telescopic shock-absorbers, such compensating capacity is provided in the form of an annular space A (see Fig. 1 of the accompanying drawing) defined between the operating cylinder C and a further and outer metallic cylinder B, said space being partially filled by the operating fluid and communicating at its lower end with the operating cylinder.

The provision of the two cylinders B and C complicates the apparatus and increases its cost, but above all the conventional arrangement just described offers a serious functional drawback in that the partly filled annular capacity A is rigidly connected with a wheel of the vehicle on which the shock-absorber is mounted, whereas the piston is rigid with the frame of said vehicle. The movements of the wheel are excessively violent, so that the acceleration factor can frequently greatly exceed that of gravity. As a result, during motion of the vehicle, the oil contained in the annular capacity A is strongly agitated and does not constantly remain at the bottom of said capacity, being only retained at the bottom at rest by gravity. Consequently, during the suction stroke which, theoretically, should cause part of the oil to pass from the capacity A into the operating cylinder space, what actually is drawn into the operating cylinder is not necessarily oil, but sometimes air and most frequently a mixture or emulsion of air and oil. Thus part of the air contained in the capacity A is drawn into the operating cylinder, which is extremely objectionable in respect to proper operation of the apparatus. For, in the first place, the emulsion alters the physical characteristics of the operating fluid oil, and, worse still, the ingress of air into the operating space creates cavitation phenomena which are very objectionable from the standpoint of comfort of the vehicle's occupants.

In a co-pending U. S. patent application Serial No. 22,836 filed April 23, 1948, now abandoned, I have suggested connecting the piston with the wheel rather than with the frame of the vehicle, and providing the compensating capacity in the form of a chamber S (see Fig. 2) within the operating cylinder and above the useful space thereof wherein the piston operates. Such construction practically completely eliminates the above-described drawbacks because the compensating capacity is now connected with the frame rather than the wheel and the vertical accelerations to which the frame is subjected are considerably lower than those of the wheel. However a drawback of the arrangement just described is that the useful stroke of the piston is considerably reduced for a given limited value of the spacing between the axes M and W.

It is an object of this invention to solve the above-defined problem in a new and improved manner which substantially does away with the limitation just mentioned. For this purpose I essentially provide the compensating capacity in the form of an expansible capacity associated with the main or operating cylinder capacity.

The said expansible capacity may among other possible construction be defined by a suitable elastic sheet-material impervious to oil, such as synthetic rubber.

In one form of embodiment which includes a piston mounted on the wheel and a cylinder connected with the frame, the elastic wall of the capacity is desirably arranged at the end of said cylinder opposite the end through which the piston-rod extends.

By way of example and to provide a fuller understanding of the invention, one exemplary embodiment thereof is illustrated in Figure 3 of the accompanying drawing.

In this embodiment my improved shock-absorber comprises a cylinder 1 in which is movable a piston 3 formed with a restricted duct 4 therethrough to allow a restricted flow of fluid through the piston. The piston 3 is connected with the wheel by a piston rod 6 through a suitable connector 5 and the cylinder 1 is connected with the vehicle frame by a connector 2 rigid with the cylinder head 7.

The compensating capacity T is defined by an expansible sheet member E, such as synthetic rubber or any other suitable elastic material impervious to oil. The sheet member E is sealed as at V around the connector shank and at W over the cylinder head. Such sealed attachment may be effected by making use of the inherent elasticity of the rubber-like material, the ends V and W thereof being suitably thickened as shown, and/or by providing suitable external clamping rings or the like.

As shown in Fig. 3, a valve F such as an assembly comprising a ball and a coil spring of suitable strength to oppose forces below a predetermined value, is provided so that the volume of oil forced into the capacity T will at no time exceed the amount strictly necessary to just compensate for the volume of the piston rod. Oil is drawn in into the operating cylinder through a "zero loading" type of check-valve formed for example by an annular strip of metal foil K of very thin gage, adapted to alternately seal and uncover ports $i$ and $j$ as the piston moves towards and away from the capacity T, respectively.

The above-described construction makes it possible to make use of the full available length of stroke for the piston within the operating cylinder; moreover, it is extremely effective in preventing the previously-described emulsion and cavitation effects, since in no portion of its circuit does the oil come into contact with air. Finally, the construction described herein makes it possible if desired to return to the more conventional arrangement in which the piston is connected with the frame rather than with the wheel of the vehicle, an arrangement in which it is easier to afford adequate protection for the piston rod.

In a modification of the present invention, I may use a tubular rod and house the expansible capacity T at the free end of the piston rod, it being understood that between the capacity and the operating cylinder space there would be interposed a suitable assembly such as that comprising the valve F and the check-valves *i* and *j* described above in connection with Fig. 3, such a valve assembly being of course essential for proper operation of the compensating capacity.

What I claim is:

1. A direct acting shock absorber for controlling the relative movements of a sprung member and an unsprung member comprising, in combination, two telescoping members comprising respectively a cylinder and a piston slidably mounted within said cylinder, the piston having a piston rod rigid therewith and extending through an end of said cylinder to the exterior thereof, means for connecting one of said members to said sprung member and means for connecting the other of said members to said unsprung member, whereby upon relative movement of said members the piston will reciprocate in said cylinder, a working liquid in said cylinder and means for by-passing said liquid from one side of the piston to the other as the latter reciprocates in said cylinder, means for compensating for the displacement of liquid from the cylinder by the periodic entrance of additional portions of the piston rod into the cylinder during operation, said last named means comprising an expansible and contractible sac of flexible and elastic material having a mouth secured about the end of said cylinder opposite the end through which said piston rod passes, at least two openings through the end of the cylinder enveloped by said sac, provided for the passage of working liquid between the interior of said sac and the interior of said cylinder at one side of the piston, pressure actuated valves controlling flow through said respective openings, the valve controlling flow from the cylinder to said sac being the more resistant to flow than the valve controlling flow in the opposite direction, said sac being disposed entirely exteriorly of the cylinder and of all parts of said shock absorber, whereby it is subject externally only to the pressure of the circumambient atmosphere.

2. A direct acting shock absorber for controlling the relative movements of a sprung member and an unsprung member comprising, in combination, two telescoping members comprising respectively a cylinder and a piston slidably mounted within said cylinder, the piston having a piston rod rigid therewith and extending through an end of said cylinder to the exterior thereof, means for connecting one of said members to said sprung member and means for connecting the other of said members to said unsprung member, whereby upon relative movement of said members the piston will reciprocate in said cylinder, a working liquid in said cylinder and means for by-passing said liquid from one side of the piston to the other as the latter reciprocates in said cylinder, means for compensating for the displacement of liquid from the cylinder by the periodic entrance of additional portions of the piston rod into the cylinder during operation, said last named means comprising an expansible and contractible sac of flexible and elastic material having a mouth secured about the end of said cylinder opposite the end through which said piston rod passes, at least two openings through the end of the cylinder enveloped by said sac, provided for the passage of working liquid between the interior of said sac and the interior of said cylinder at one side of the piston, pressure actuated valves controlling flow through said respective openings, the valve controlling flow from the cylinder to said sac being the more resistant to flow than the valve controlling flow in the opposite direction, said sac and the interior of said cylinder both being full of working liquid at all times to the exclusion of air or any emulsion-forming gases, said sac being disposed entirely exteriorly of the cylinder and of all parts of said shock absorber, whereby it is subject externally only to the pressure of the circumambient atmosphere.

3. A direct acting shock absorber for controlling the relative movements of a sprung member and an unsprung member comprising, in combination, two telescoping members comprising respectively a cylinder and a piston slidably mounted within said cylinder, the piston having a piston rod rigid therewith and extending through an end of said cylinder to the exterior thereof, means for connecting one of said members to said sprung member and means for connecting the other of said members to said unsprung member, whereby upon relative movement of said members the piston will reciprocate in said cylinder, a working liquid in said cylinder and means for by-passing said liquid from one side of the piston to the other as the latter reciprocates in said cylinder, means for compensating for the displacement of liquid from the cylinder by the periodic entrance of additional portions of the piston rod into the cylinder during operation, said last named means comprising an expansible and contractible sac of flexible and elastic material having a mouth secured about the end of said cylinder opposite the end through which said piston rod passes, at least two openings through the end of the cylinder enveloped by said sac, provided for the passage of working liquid between the interior of said sac and the interior of said cylinder at one side of the piston, pressure actuated valves controlling flow through said respective openings, the valve controlling flow from the cylinder to said sac being the more resistant to flow than the valve controlling flow in the opposite direction, said sac and the interior of said cylinder both being full of working liquid at all times to the exclusion of air or any emulsion-forming gases, said sac being disposed entirely exteriorly of the cylinder and of all parts of said shock absorber, whereby it is subject externally only to the pressure of the circumambient atmosphere, a rigid stem having one end fixed to the end of said cylinder to which said sac is applied and extending through a sealed opening approximately centrally of said sac and provided with means at its outer end for securing it to one of said members.

References Cited in the file of this patent

UNITED STATES PATENTS

| | | |
|---|---|---|
| 1,304,311 | Heldrich | May 20, 1919 |
| 1,457,122 | Ree | May 29, 1923 |
| 1,825,233 | Joyce | Sept. 29, 1931 |
| 2,149,040 | Binder et al. | Feb. 28, 1939 |
| 2,314,404 | Katcher | Mar. 23, 1943 |
| 2,357,278 | O'Connor | Aug. 29, 1944 |
| 2,410,176 | Magrum | Oct. 29, 1946 |
| 2,417,504 | Knaggs et al. | Mar. 18, 1947 |
| 2,571,279 | Myklestad | Oct. 16, 1951 |

FOREIGN PATENTS

| | | |
|---|---|---|
| 331,444 | Italy | Nov. 6, 1935 |